March 2, 1937. R. E. GREENFIELD ET AL 2,072,633
MANUFACTURE OF STARCH
Filed Sept. 23, 1932
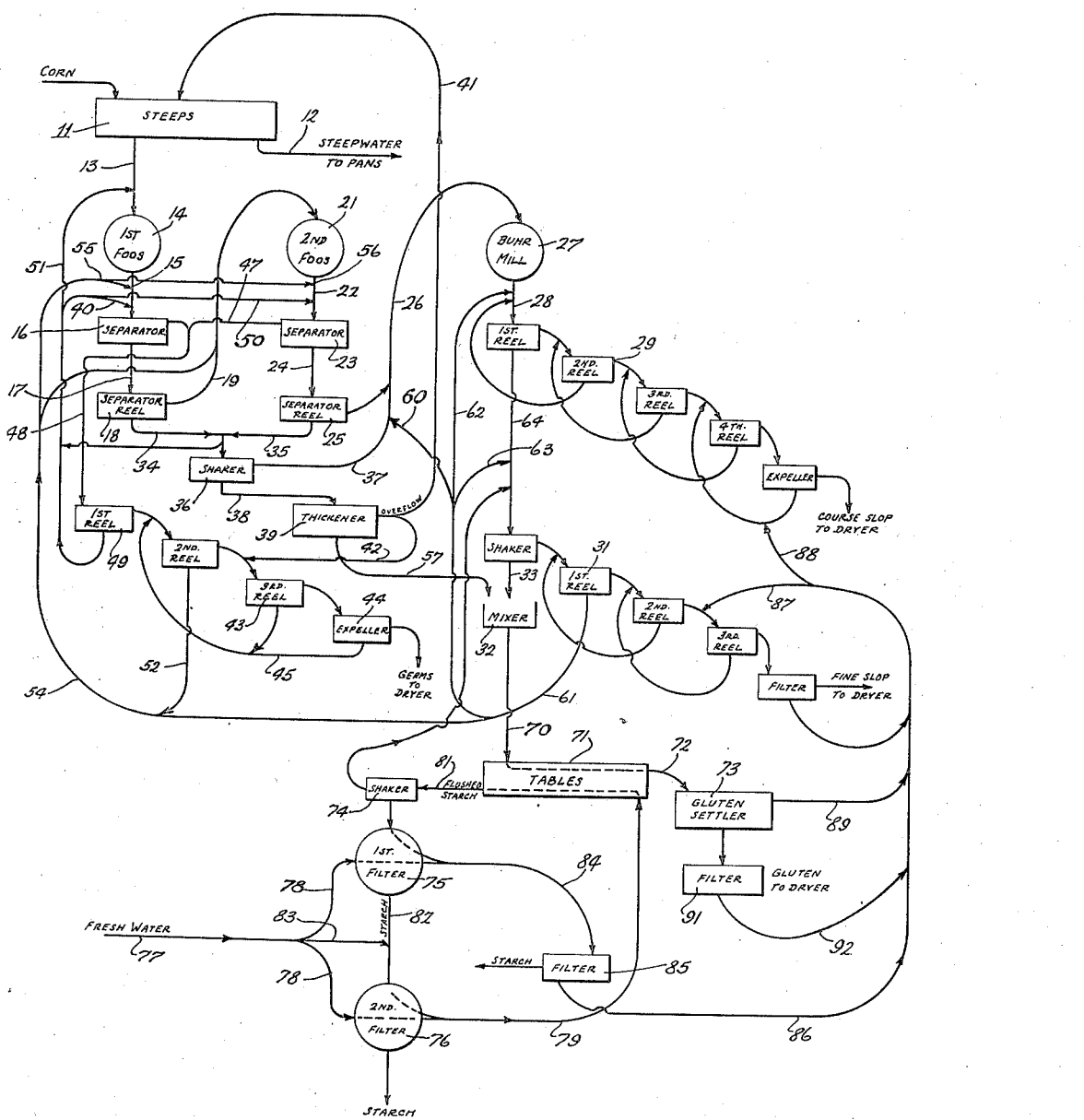

Patented Mar. 2, 1937

2,072,633

UNITED STATES PATENT OFFICE 2,072,633

MANUFACTURE OF STARCH

Robert Edman Greenfield and Harold R. Baker, Decatur, Ill., assignors to A. E. Staley Manufacturing Company, Decatur, Ill., a corporation of Delaware Application September 23, 1932, Serial No. 634,557

9 Claims. (Cl. 127—69)

This invention relates to the manufacture of starch from corn and has more particular reference to improvement in the handling and use of the waters employed in effecting the separation of the starch from the other ingredients, and to the recovery of the solubles.

The manufacture of starch from corn is accomplished fundamentally by water separation and flotation operations and heretofore has consisted generally in first soaking or steeping the corn, then breaking up the kernels so that the corn germs may be removed from the starch bearing materials; thereafter grinding the starch bearing materials to separate the starch and gluten from the bran and fibrous parts and finally separating the starch from the gluten. All of these operations are carried on with the use of large quantities of water employed to convey the corn during its disintegration through the various grinding mills, screening reels, filters, etc., and with the use also of a large amount of water to permit a gravity separation of the starch and gluten and the floating off of the gluten for separate disposition.

The corn contains a substantial percentage of soluble material in addition to the insoluble germs, fibers, starch, and gluten. The soluble components must, of course, be removed from the starch and should be recovered from the waters dissolving them since they are advantageously usable in the manufacture of stock feed. After removal of the germs the remainder of the corn kernels is ground in suitable mills and the grind is successively passed through sieves or screens to separate the bran and fibrous materials from the starch and gluten, this bran and fibrous material being known generally in the industry as slops.

A large percentage of the solubles of the corn is taken up in the water used in the steeping and washing of the corn preparatory to its delivery to the attrition mills, breaking it up for liberation of the germs, and a considerable percentage also is taken up by the waters in the germ separating operations. As the starch bearing materials are carried on through the succeeding separating apparatus the remaining solubles are dissolved. The steep water is delivered directly in accordance with usual practices to the evaporating pans and the waters used in the starch separating operations have been circulated and recirculated through a closed system to increase the soluble concentration and for final delivery through the steeps to the soluble recovery apparatus.

The point of highest soluble concentration normally occurring in the manufacture of starch is at the head end of the process where the germs are removed.

This invention has for its principal object the removal of water for return to the steeps, and the recovery of the solubles from a point at or adjacent the highest natural soluble concentration, and as a corollary reduction of soluble content in the waters employed for the subsequent starch separating operations. The invention contemplates the removal of a large portion of the water employed in the removal of the germs and its direct return to the steeps. Preferably the water employed in the initial operation of the process, i. e. the rough grind of the corn and the separation of the germs, is water which has been previously used in the mill house to separate the bran and fibers (called coarse and fine slops) from the starch and gluten so that all of the water introduced into the system is finally taken out of it from the steeps for evaporation and recovery of solubles.

The invention has for a further object the improvement in the water balance of the wet starch system. By withdrawing water at the germ separating system for delivery to the steeps it becomes possible to use a considerably larger amount of wash water in the coarse and fine slop systems and still maintain the proper concentration of the material passing to the tables. This in many cases will result in a better washing of these slops and consequently an improved starch recovery.

The water used for steeping contains a higher concentration of soluble than the gluten settler water which has been customarily used for steeping purposes. By using water of a higher concentration it is possible to remove the proper amount of soluble and still keep the soluble concentration in the wet starch process within workable limits by the withdrawal of a smaller amount of steep water than would otherwise be the case. Since the evaporation of steep water is a relatively expensive operation, a reduction of the amount evaporated results in a substantial economy.

Numerous other objects and advantages of the invention will be apparent as it is better understood from the following description, which, when taken in connection with the accompanying drawing, discloses a preferred embodiment thereof.

Referring to the drawing,

The single figure on the drawing is a flow sheet of the process embodying the present invention.

The corn is first introduced into the usual steep house, indicated on the flow sheet by reference character 11, where it is steeped for the desired or usual time and is then washed. The steep water takes up a considerable percentage of the solubles and is delivered out through a line, indicated at 12, for evaporation in pans or otherwise. After washing, the corn from which most of the steep water has been removed is delivered by a line 13 for breaking up in an attrition mill 14 (identified on the flow sheet as a Foos Mill). In this mill the corn is broken sufficiently to permit separation of most of the germs. From the mill 14 the corn passes by a line 15 into a germ separator 16 wherein such germs as have been liberated from the corn are floated off for delivery to a germ washing system to be presently described. The remainder of the corn from the separator is delivered by a line 17 into a separator reel 18 in which such starch and gluten as have been separated are removed.

The partially degerminated corn is delivered from the separator reel 18 by a line 19 to a second attrition (Foos) mill 21 where the corn is further broken up to permit removal of the remaining germs. These germs with the residual fiber and starch constituents are delivered through a line 22 into a second germ separator 23 from which the remaining germs are floated off.

From the separator 23 the starch bearing material is delivered by a line 24 to a second starch separator reel 25 for removal of existent free starch and gluten. From the reel 25 the remaining starch bearing materials are carried by a line 26 to a grinding mill 27 (identified on the flow sheet as a Buhr Mill), where they are finely broken up and delivered through a line 28 successively to two series of separators for removing, first, the coarser fibrous materials and bran (together called coarse slops) and then for removing the finer bran and fibers (called fine slops).

The series of separators are indicated respectively by reference characters 29 and 31. In these two series of separators the corn bearing material is serially treated with attendant removal of starch and gluten.

As will be presently more fully explained, a counterflow of water is provided to advance the starch bearing materials successively through the separating units. The starch milk from which the germs and slops have been removed is next delivered to a mixer 32 into which is deposited the starch and gluten separated from the corn bearing material as an incident to the removal of the germs.

The starch milk from the separator reels 18 and 25 is delivered through lines 34 and 35 to a sieve or shaker 36, in which any contained fiber and bran is removed, and delivered through lines 37 and the line 26 to the grinding mill 27 already mentioned. The starch milk from which the slops have thus been separated is delivered through a line 38 with considerable water in which a large percentage of the solubles remaining in the corn after the steeping have been dissolved. The starch milk is delivered into a thickener 39 in which substantially all of the water containing the solubles is separated from the starch and gluten. A large portion of this water is delivered by a line 41 into the steeps and the remainder is delivered by line 42 into the germ washing system of reels.

The water which passes through the line 42 is introduced near the delivery end of the germ separating system and progresses in the counterflow toward the receiving end of the series of separator reels. The germs removed in the germ separators 16 and 23 are delivered to lines 47 and 48 into the first germ separator reel 49 and are carried progressively through the reels to the expeller 44. Water from this expeller 44 is carried by line 45 for introduction to the germ washing system between the first and second germ washing reels.

From the first reel the wash water is removed by line 51 for make-up water, entering the first attrition mill 14 through line 15 and the separators 16 and 23 through branches 40 and 50 which deliver into conduits 15 and 22 respectively, and additional water is removed from the second reel of the wash system by line 52, and by line 54 is carried up for introduction through lines 55 and 56 into lines 15 and 22 leading respectively into the separators 16 and 23.

A substantially closed system of germ separating and washing is thus provided and from which waters containing highly concentrated solubles taken from the point of highest soluble concentration are delivered to the steeps and are replaced by water derived from the coarse and fine slops series of reels 29 and 31 as will now be described.

A line 61 leads from the first reel of the fine slop system 31 into connection with lines 52 and 54 to supply make-up water through the separators 16 and 23. A branch 62 leads from line 61 and delivers water into a line 66 which delivers the starch bearing materials from the first or coarse slop separating system to reels 29 into the second or fine slop system of reels 31. A line 60 branches from the line 62 into line 37 to supply additional make-up water into the grinding or Buhr mill 27.

The water is circulated throughout a substantially closed system in the mill house and through also the tables and gluten settlers. In this substantially closed system of water circulation the water traverses, of course, generally as follows: The starch is finally separated from the gluten on tables 71, the gluten being carried off through line 72 into settlers 73. From the settlers 73 the water relieved of its gluten is carried by line 89 up to two branches 87 and 88 leading respectively to just back of the last reels of the coarse and fine slop system. In each of these two systems the water is progressively put through the series of reels until it has extracted all the starch and gluten from the slops and passed the starch milk into the mixer 32 from whence it passes to the tables through line 70 and on over the tables and again through the system.

The starch and gluten extracted in the separator reels 18 and 25 and cleared of slops in the shaker 36 are delivered in substantially dry condition from the thickener 39 into the mixer 32 where it is mixed with the starch milk delivered out of the mill house to the line 33. After being tabled the starch is flushed over the tables and washed. It is carried through a line 81 to a shaker 74 and thence through two filters 75 and 76. Fresh water is introduced into the system at these two washing filters through a line 77 having two branches 78 leading respectively to the first and second filters 75 and 76. The starch is removed from the first filter through a line 82 into which fresh water is introduced from line 77 by a line 83.

The wash water taken from the first filter 75 is delivered through line 84 to a check filter 85 and from the check filter 85 it is conveyed by a line 86 up for delivery through branches

87 and 88 as make-up water in the coarse and fine slop systems.

The water from the second filter 76 is preferably used to flush the starch from the tables and other positions by line 79 leading up to the tables for this purpose.

The gluten remaining in the gluten settler 73 is delivered into a filter 91 and the water from this filter 91 is added to the wash waters of the starch, as may be observed on the flow sheet.

It is thought that the invention and many of its attendant advantages will be understood from the foregoing description and it will be apparent that various changes may be made in the steps and their order of accomplishment of the process described without departing from the spirit and scope of the invention or sacrificing all of its material advantages, the process hereinbefore described being merely a preferred embodiment thereof.

We claim:

1. In the recovery of starch and other products from corn, the process which comprises steeping the corn in water to soften the corn kernels and remove water-soluble materials therefrom, draining the steep water from the corn, breaking up the steeped corn kernels, separating the germs of the broken-up corn kernels from the starch-bearing portion thereof by starch milk flotation, employing at least a portion of the water of the starch milk from said flotation for steeping additional corn, grinding the starch-bearing portion of said corn, separating fibrous materials from the ground portion of said corn by washing with water to form additional starch milk, and employing at least a portion of said additional starch milk in said flotation.

2. In the recovery of starch and other products from corn, the process which comprises steeping the corn in water to soften the corn and remove water-soluble materials therefrom, draining the steep water from the corn, breaking up the steeped corn kernels, separating the germs of the broken-up corn kernels by starch milk flotation, removing the starch-bearing portions of the corn which are suspended in said starch milk during the flotation operation, employing a substantial quantity of water from said starch milk for steeping additional corn, and employing an additional quantity of water from said starch milk for washing the separated germs.

3. In the recovery of starch and other products from corn, the process which comprises steeping the corn in water to soften the corn and to remove water-soluble materials therefrom, draining the steep water from the corn, breaking up the steeped corn kernels, separating the germs of the broken-up corn kernels by water flotation, separating the fibrous constituents of the remainder of said corn in the flotation water, separating a major portion of the flotation water from the remainder of the corn to form a quantity of starch-free water and a quantity of starch-containing water, employing a portion of said starch-free water for steeping additional corn, employing an additional quantity of said starch-free water for washing said germs, washing said fibrous constituents with water to form a starch water mixture, separating the starch from said starch water mixture and from said starch-containing water, washing the separated starch with fresh water, and employing said starch wash water for washing said fibrous constituents.

4. In the recovery of starch and other products from corn, the process which comprises steeping the corn in water, cracking the steeped corn, removing the germs from the cracked corn by water flotation, employing a part of said flotation water for steeping additional corn, removing the fibrous constituents of the remainder of said corn, washing said constituents with water, separating the remaining gluten and starch in said corn, employing the water from the gluten to wash said fibrous constituents, washing the starch with fresh water, washing said fibrous constituents with said starch wash water, and employing the water used for washing said fibrous constituents for said flotation water.

5. In the recovery of starch and other products from corn which comprises steeping the corn in water, cracking the steeped corn, removing the germs from the cracked corn by water flotation, grinding the corn, removing the fibrous constituents of the corn by water washing, separating the starch and gluten constituting the remainder of the corn, washing the starch and separating the water from the gluten, the improvements which include employing water from the starch wash and water from the gluten for washing the fibrous constituents, employing the wash water from said fibrous constituents for said flotation, and employing said flotation water for steeping additional corn.

6. In the recovery of starch and other products from corn, the process which comprises steeping the corn, breaking up the steeped corn, separating the germs of the broken-up corn from the starch-bearing portions thereof by starch milk flotation, separating the fibrous constituents of said starch-bearing portions by washing with water, dewatering the starch milk from said flotation operation, employing at least a portion of the water from said starch milk in said steeping operation, employing a portion of the wash water from said fibrous constituents for said flotation operation, mixing another portion of said wash water with the starch from said dewatered starch milk, removing gluten from said mixture, and employing sufficient water for washing said fibrous constituents to supply said flotation operation and to produce in said mixture a gravity which is favorable to the removal of gluten therefrom.

7. In the recovery of starch and other products from corn, the process which comprises steeping the corn, breaking up the steeped corn, separating the germs of the broken-up corn from the starch-bearing portions thereof by starch milk flotation, separating the fibrous constituents from the starch-bearing portions of the corn by washing with water, dewatering the starch milk from the flotation operation, employing at least a portion of the water from said starch milk in the steeping operation, employing another portion of the water from said starch milk for washing the germs separated from the corn, returning the germ-washed water to the flotation operation, and employing a portion of the wash water from said fibrous constituents in said flotation operation.

8. In the recovery of starch and other products from corn, the process which comprises steeping the corn, breaking up the steeped corn, separating the germs of the broken-up corn from the starch-bearing portions thereof by starch milk flotation, separating the fibrous constituents from the starch-bearing portions of the corn by washing with water, dewatering the starch milk from the flotation operation, employing at least a portion of the water from said starch milk in the steeping operation, employing another portion of the water from said starch milk for washing the germs separated from the corn, returning the germ-washed water to the flotation operation, employing a portion of the wash water from said fibrous constituents in said flotation operation, mixing another portion of the wash water from said fibrous constituents with the starch from said dewatered starch milk, removing gluten from said mixture to produce starch, washing said starch with fresh water, and employing said starch-washed water for washing said fibrous constituents.

9. In the recovery of starch and other products from corn, the process which comprises steeping the corn, breaking up the steeped corn, separating the germs of the broken-up corn from the starch-bearing portions thereof by starch milk flotation, separating the fibrous constituents from said starch-bearing portions by washing with water, dewatering the starch milk from said flotation operation, employing a portion of the water from said starch milk in the steeping operation, employing another portion of the water from said starch milk for washing the germs removed in said flotation operation, employing a portion of the wash water from said fibrous constituents in the flotation operation, mixing another portion of said wash water with the starch from said dewatered starch milk, removing gluten from said mixture, and employing sufficient water for washing said fibrous constituents to supply said flotation operation and to produce in said mixture a gravity which is favorable to the removal of gluten therefrom.

ROBERT EDMAN GREENFIELD.
HAROLD R. BAKER.